No. 668,030. Patented Feb. 12, 1901.
J. J. WOOD.
MEANS FOR STOPPING ELECTROMOTORS.
(Application filed Oct. 15, 1900.)
(No Model.) 2 Sheets—Sheet 1.
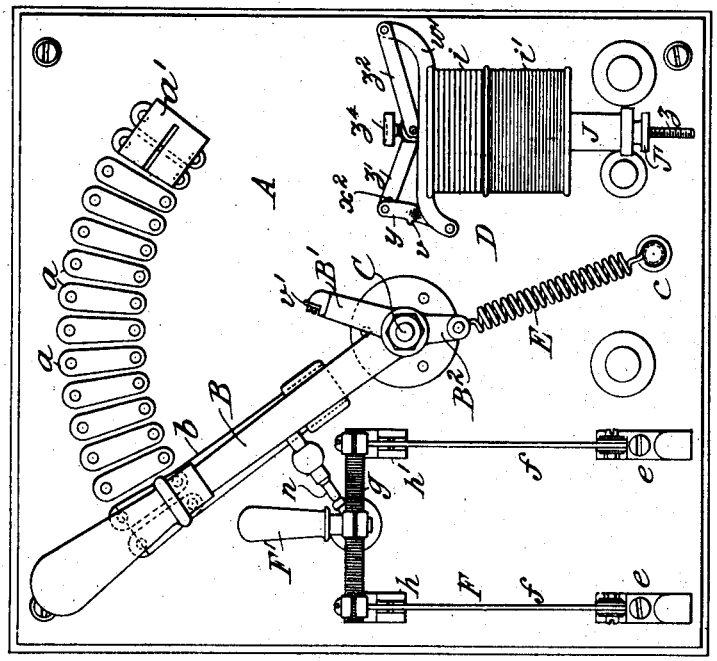
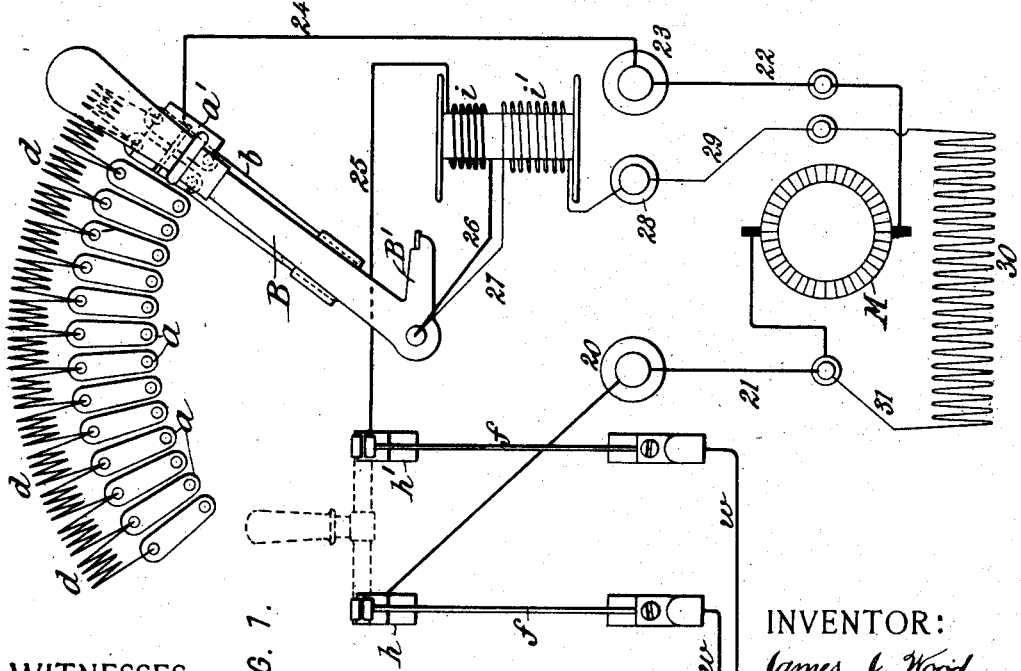
WITNESSES:
Fred White
Thomas F. Wallace
INVENTOR:
James J. Wood,
By Attorneys,

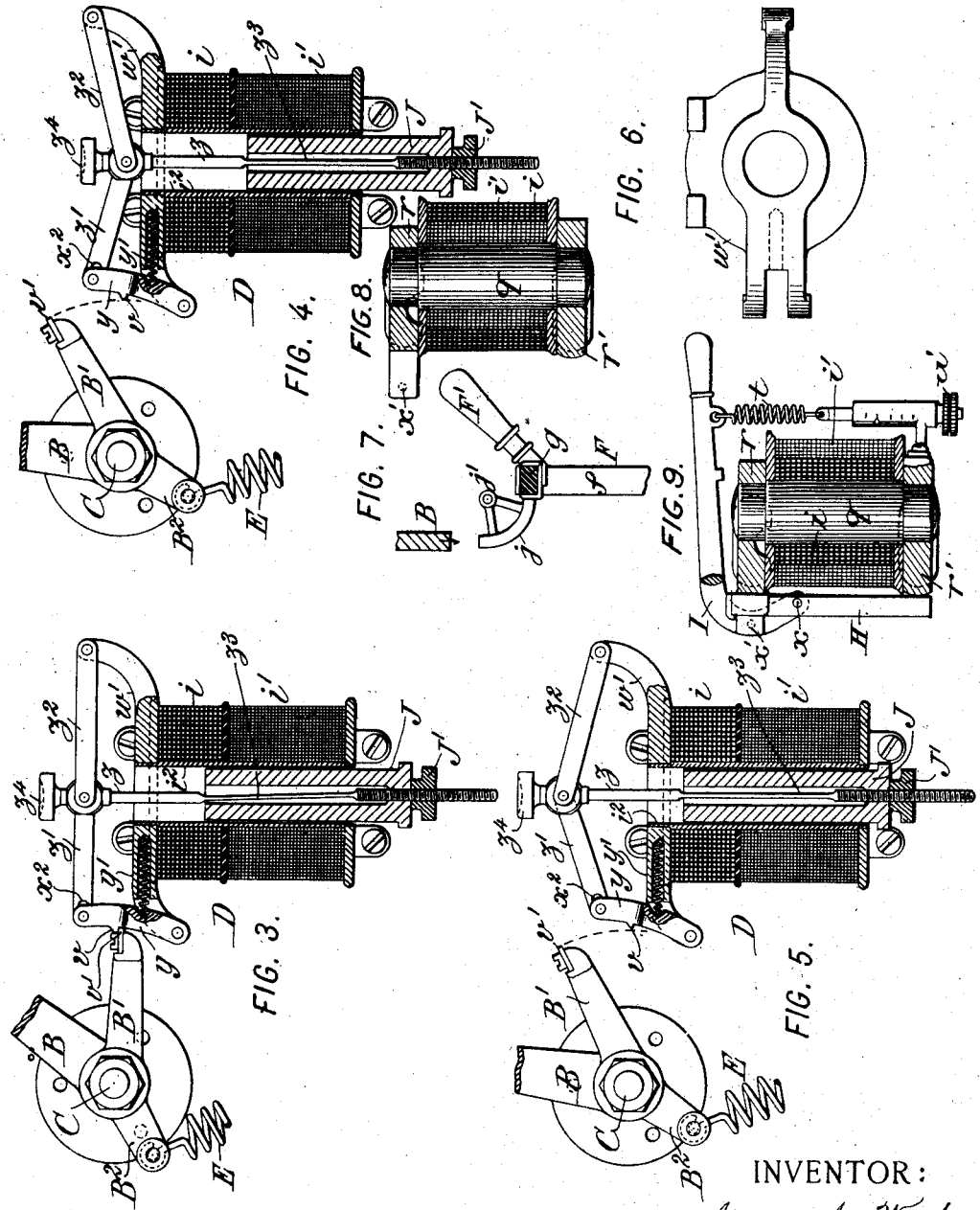

UNITED STATES PATENT OFFICE.

JAMES J. WOOD, OF FORT WAYNE, INDIANA.

MEANS FOR STOPPING ELECTROMOTORS.

SPECIFICATION forming part of Letters Patent No. 668,030, dated February 12, 1901.

Application filed October 15, 1900. Serial No. 33,040. (No model.)

*To all whom it may concern:*

Be it known that I, JAMES J. WOOD, a citizen of the United States, residing at Fort Wayne, in the county of Allen and State of Indiana, have invented certain new and useful Improvements in Means for Stopping Electromotors, of which the following is a specification.

This invention provides an improved controlling means for electromotors adapted to break the circuit and stop the motor in the case either of a cessation of current or of an overload of the motor.

It has been customary in starting and stopping devices for electromotors to employ a circuit-breaker or switch controlled by two electromagnetic devices, the one responding to an overload or maximum current and the other responding to a minimum current or cessation of current, these magnets being so connected to the circuit-breaker or switch as to break the circuit to the motor in the event of either an overload or an extreme diminution or cessation of electric energy. It has been proposed to simplify such mechanisms by providing a single magnet to perform the functions of both the overload and so-called "underload" magnets. Such combined overload and underload magnet has had a single winding of coarse wire connected in series with the motor and has been constructed to release the circuit-breaking means upon its magnetization ceasing or falling to a minimum, as in the case of a break in the circuit, or rising to a maximum, as in the case of an overload. Such a means for protecting the electromotor is operative under certain conditions, but is subject to the disadvantage that it is liable to act too quickly and is not adapted to a motor operating with an accelerating load. For example, it has been found that under some circumstances the mere switching over from one dynamo to another at the generating-station will cause such a control-magnet to act to cut the motor out of circuit, or, if the motor is operating with an accelerating load, like an electric elevator, such acceleration will so nearly extinguish the current through the exciting-coil of the magnet as to cause the magnet to cut out the motor.

The object of my present invention is to overcome these disadvantages and enable a combined overload and underload magnet to be used for the protection of an electromotor under all the circumstances occuring in practice. To these ends, according to my invention I provide a controlling-magnet with two windings, wound to receive currents in like direction, so as to coöperate in magnetizing the magnet, one being a series coil connected in series with the motor-armature and the other being a shunt-coil connected in series with the field-exciting coil of a motor. Hence whenever a current is flowing to or from the armature-terminals of the motor the control-magnet is proportionately magnetized by the series coil, and whenever a current traverses the field-coil of the motor to maintain its field excitation the control-magnet is proportionately excited by means of its shunt-winding. If the main circuit is broken, the electromotor continuing to run under its momentum maintains for a short time its own excitation, and during such time the control-magnet is proportionately excited, so that its action as an underload-magnet is retarded. If the motor races under an accelerating load, its counter electromotive force, which may extinguish the current in the series coil of the control-magnet, augments the current through the shunt-coil thereof, so that it maintains the magnetization of the control-magnet.

My invention also provides a novel construction of control-magnet adapted to respond to either a maximum or minimum magnetization.

My invention is ordinarily and preferably applied in connection with a motor-starting box or rheostat wherein the movement of a rheostat-arm after the circuit is closed to start the motor successively cuts out resistances which are in series with the armature, so that when the latter reaches full speed it may be connected directly in the external circuit without interposed resistance. I prefer to apply my invention to such a resistance-box in which the rheostat-arm is impelled by a spring to the position of maximum resistance and is held against the spring-pressure in the position of no resistance by the control-magnet, which is constructed as a detent, whereby when the control-magnet becomes over or under magnetized it releases the arm, which, moving over under the tension of its spring, first introduces the resistances in circuit and then actuates the circuit-breaker to break the main circuit. I here show and describe only so much of such construction as is necessary to enable the preferred application of my present invention to be understood.

Figure 1 of the accompanying drawings is a diagrammatic view showing the circuit connections and windings, the parts being shown in the position of normal running of the motor. Fig. 2 is an elevation showing the front of the starting-box with the parts in position for starting the motor. Fig. 3 is a section of the control-magnet, showing the specific construction of the latter and its engagement with the rheostat-arm when in the position of normal running. Figs. 4 and 5 are similar views to Fig. 3, the former showing the action of the magnet in the case of an underload or cessation of current and the latter in the case of an overload or extreme augmentation of current. Fig. 6 is a plan of the top plate of the controlling-magnet. Fig. 7 is a fragmentary side view, looking from the left in Fig. 2, showing a means for causing the rheostat-arm to operate a switch. Figs. 8 and 9 are cross-sections of modified forms of magnets.

In order that one mode of applying my present invention may be understood, I will describe in some detail the motor starting and stopping means shown in the drawings, the particular means here shown being that set forth in my allowed application, Serial No. 723,498, filed July 11, 1899, Patent No. 663,207, granted December 4, 1900. It is understood, however, that my invention is not necessarily restricted in its application to the particular means shown and described.

Let A designate the base or front plate of the starting-box or rheostat, of which $a$ $a$ are the contact segments or terminals of the resistant-coils, and B is the contact-arm, which swings over the series of segments, turning around a central stud C, and formed, as usual, with a suitable handle and with a contact spring or plate $b$. The contact-arm B is formed with a short arm B', which in normal use is engaged by the controlling-magnet or magnetic detent D, thereby holding the arm in the position shown in Fig. 1, and it has another short arm $B^2$, to which is connected a suitably-stiff spring E, the opposite end of which is attached to a suitable fixed point $c$ on the base A, the effect of this spring being upon the release of the contact-arm by the controlling-magnet D to throw the arm across the series of contacts to the position shown in Fig. 2, and thereby cut in the resistance of the entire series of coils, which coils are indicated diagrammatically at $d$ $d$ in Fig. 1.

Mounted upon the plate A is a double-pole switch F, of any suitable or usual construction, which in the construction shown consists of two conducting-blades $ff$, pivoted to circuit-terminals $e$ $e$, to which are connected the main-circuit wires $w$ $w$, Fig. 1, and the upper ends of which are coupled together by an insulating-bar $g$, to which is attached a handle F'. When the switch is closed, as shown, the upper ends of the blades $ff$ enter into forked contacts $h$ $h'$, respectively. These contacts are connected, as shown in Fig. 1, the former to a binding-post 20, which connects by a wire 21 to one terminal or brush of the motor, while the opposite terminal thereof connects by wire 22 to binding-post 23, which is connected by wire 24 to the terminal contact-segment $a'$ of the series of segments $a$, while the opposite contact-piece $h'$ connects by wire 25 to the winding or coil $i$ of the controlling-magnet D, the opposite terminal of this coil being connected by wire 26 to the pivot C, upon which the contact-arm B turns. This pivot C is also connected by a wire 27 with the coil or winding $i'$ of the magnet D, the opposite end of which is led to a binding-post 28, to which post is connected the shunt-wire 29, leading to one terminal of the field-magnet coil 30 of the motor, the opposite terminal of which connects by wire 31 to the wire 21. The motor shown in Fig. 1 (designated as a whole by the letter M) is of the shunt-wound type.

When the double-pole knife-switch F is thrown down, it of course breaks the main circuit $w$ $w$. For thus throwing it down automatically I provide a switch-actuator, which consists of means for throwing out the switch F clear of its contacts $h$ $h'$, which means is actuated by the contact-arm B when the latter swings over under the impulse of its spring E to the position shown in Fig. 2 and strikes a pin or buffer $n$. The switch-actuator is therefore a sort of "kicker" for imparting an outward or forward thrust to the switch F upon being itself struck by the arm B when the latter has traveled home. I do not illustrate the preferred form of this actuator, as it forms no necessary part of my present invention and is fully set forth in my aforesaid application; but to make clear its essential principle I illustrate in Fig. 7 a simple construction of such kicker, consisting of an elbow-lever pivoted at $j'$ and arranged to be struck at one side by the arm B when the latter flies over and adapted to communicate this blow in an outward direction to throw the switch F forward.

I will now describe in detail the particular construction of controlling-magnet or magnetic detent D which is shown in the drawings. This magnet is shown as of the solenoid type, its coils $i$ and $i'$ being wound in any suitable manner upon a supporting tube or spool $i^2$. As shown, the series coil $i$ is wound above and the shunt-coil $i'$ is wound below; but I do not limit myself to this arrangement. The upper head of the spool is a plate $w'$, (shown separately in Fig. 6,) having at its left-hand end forked arms, between which is pivoted a catch arm or dog $y$, which is pressed toward the left by a spring $y'$, housed in a socket in the plate or head. This catch is formed with a projection or tooth $v$, engaging a tooth or plate $v'$ on the arm B'. The upper end of the catch-dog $y$ is connected by a toggle-link $z'$ to a central rod $z$, to which in turn is connected a toggle-link $z^2$, the opposite end of which is pivoted to an arm at the right of the plate $w'$. The rod $z$ passes down through the spool, and on its threaded lower end is attached the solenoid-core J, constituting the movable member of the control-magnet. This core preferably screws on the rod and has a set-nut J'.

In throwing over the rheostat-arm B to the position of normal running its arm B' comes down and presses back the catch $y$ against its spring $y'$, so that the catch-plate $v'$ passes beneath the tooth $v$. To facilitate this, the teeth $v\ v'$ are (one or both) beveled at their ends. Fig. 3 shows the position of the parts in the condition of normal running, the arm B' being held by the catch-dog $y$ and the solenoid-core occupying a position mainly within the shunt-coil $i'$ and the toggle-links $z'\ z^2$ being extended. If under these conditions the current should increase beyond the maximum for which the instrument is adapted, this increased current in the series coil $i$ would draw the core J upward to the position shown in Fig. 5, so that by communicating an upward thrust through the rod $z$ it would bend the toggle-links upward, as shown in that figure, and thereby pull back the dog $y$ and free the arm B', as there shown. If, on the contrary, the current should cease or fall below the minimum provided for, the weight of the core J would be no longer sustained by the attraction of the coils and the core would fall to the position shown in Fig. 4, thereby communicating a downward pull to the toggles and through the latter pulling the catch-dog $y$ toward the right, as shown, and hence freeing the arm B'. These movements communicated to the toggles cause the upper end of the rod $z$ to move in an arc, and hence this rod is flattened at $z^3$ to render it flexible.

In starting the motor the closing of the switch F causes the normal exciting-current to flow through the shunt-circuit, thereby energizing the coil $i'$ and drawing up the core from the position shown in Fig. 4 to that shown in Fig. 3, where the dog $y$ is pressed toward the left by its spring $y'$ in position to engage the arm B' when the rheostat-arm has been thrown over to cut out the resistance. To permit the dog $y$ to yield as the plate $v'$ passes its tooth $v$, its upper end engages a slot $x^2$ in the toggle $z'$.

In case it is desired to stop the motor it is only necessary to press down the rod $z$ to the position shown in Fig. 4, for which purpose a head or button $z^4$ is provided, or the rod might be pulled up to the position shown in Fig. 5.

With this construction of magnet an adjustment for different loads or different sizes of motors may be accomplished by raising or lowering the core J in the solenoid, this being done by loosening its set-nut J' and screwing the core up or down to the desired position and retightening the set-nut.

The double winding $i\ i'$ for the control-magnet, which constitutes the principal feature of my invention, (whether applied to the solenoid type of magnet shown or to any other type of magnet to which it is applicable,) has the important advantage that the magnet when acting as an underload-magnet is prevented from acting too suddenly or with too great sensitiveness. In the case, for example, of a mere momentary break in the main circuit, such as occurs when switching over at the generating-station from one dynamo to another, the magnet will not be instantly demagnetized, and thereby cut out the motor, as has been liable to occur with control-magnets as heretofore made, but, on the contrary, the motor-armature, which is rapidly revolving, continues to revolve because of its momentum, and thereby acts for a short time as a dynamo-generating current, which traverses the local circuit from one brush of the motor by way of 31, 30, 29, 28, coil $i'$, 27, B, 24, 23, and 22 back to the other brush of the motor, so that the current traversing this circuit maintains the excitation of the motor-field and also keeps the control-magnet excited until the motor slows down nearly to stopping. Thus even a slow switching over at the central station, which with prior controlling means would be liable to cut out every motor in the circuit, has no effect when the control-magnets are constructed and connected according to my invention. If the motor-armature races under an accelerating load, its counter electromotive force, which ordinarily extinguishes the current in the series coil $i$, results in sending a current over the local circuit above named, which is added to the current from the line through the motor-field winding 30 and shunt-winding $i'$ of the magnet, so that as the magnetization of the magnet by the coil $i$ decreases it is augmented in the coil $i'$, and the excitation of the control-magnet is thereby maintained. If the dynamo should slow down, an effect equivalent to the racing of the motor is produced, and this is compensated for in the same manner.

As already stated, my generic invention is not limited in its application to a magnet of the solenoid type, but may be applied to any form of magnet. For many purposes it is preferable to adopt the form and construction of magnet which is set forth and claimed in my aforesaid application, Serial No. 723,498, (Patent No. 663,207.) My improved winding as applied to this kind of magnet is shown in Figs. 8 and 9. I need not here describe the mechanical construction of this magnet, since this is fully set forth in my said application. It suffices to say that $q$ is the magnet-core, having upper and lower pole-pieces $r$ and $r'$, which are normally bridged by a movable armature H, pivoted at $x$ on a lever I, which is fulcrumed at $x'$ and has a retracting spring $t$, adjusted by a screw $u'$. In Fig. 9 the armature is shown attracted to the magnet by an overload. In Fig. 8 the armature-lever and retracting means are omitted.

My invention is not limited to any particular arrangement of the windings $i$ $i'$. Two modified modes of winding are shown in Figs. 8 and 9. In Fig. 8 the shunt-coil $i'$ is wound on the inner part of the spool and the series coil $i$ on the outer part. In Fig. 9 the contrary arrangement is shown, the series coil $i$ being wound on the inner part and the shunt-coil $i'$ on the outer part.

My invention is susceptible of other modifications and is not to be understood as limited to the precise construction or arrangement of parts or precise circuit connections shown. Those features which I believe to be essential to my invention are set forth in the claims.

I claim as my invention the following defined novel features, substantially as hereinbefore specified, namely:

1. A magnet for a motor-controller adapted to remain inactive during the normal range of current variations, and to respond to either a minimum or maximum current, having a double winding comprising a series coil and a shunt-coil wound to receive currents in like direction, so as to coöperate in the magnetization of said magnet, whereby the magnet will not act as an underload-magnet so long as a magnetizing-current continues in either of said coils.

2. A magnet for a motor-controller adapted to remain inactive during the normal range of current variations, and to respond to either a minimum or maximum current, having a double winding comprising a series coil and a shunt-coil wound to receive currents in like direction so as to coöperate in the magnetization of said magnet, the former coil being connected in series with the motor-armature and the latter connected in shunt therewith so as to receive a counter-current from the armature.

3. The combination with an electromotor of a control-magnet having two windings, both wound to receive currents in like direction so as to coöperate in magnetizing it, the one a series coil in series with the motor-armature, and the other a shunt-coil in series with the field-exciting coil of the motor.

4. The combination with an electromotor of a control-magnet having two windings, both wound to receive currents in like direction so as to coöperate in magnetizing it, the one a series coil in series with the motor-armature, and the other a shunt-coil in series with the field-exciting coil of the motor, and a circuit-breaker operated by the demagnetization of said magnet.

5. The combination with an electromotor of a control-magnet having two windings, both wound to receive currents in like direction so as to coöperate in magnetizing it, the one a series coil in series with the motor-armature, and the other a shunt-coil in series with the field-exciting coil of the motor, and a circuit-breaker controlled by said magnet and operated to break the circuit between the motor and dynamo when the magnetization of said magnet falls to a minimum or rises to a predetermined maximum.

6. A safety device for an electromotor, comprising a rheostat and its arm, and an electromagnetic detent for holding said arm in the normal running position, adapted to release said arm when its magnetization falls to a minimum or rises to a predetermined maximum, said magnet having a double winding comprising a series coil and a shunt-coil wound to receive currents in like direction so as to coöperate in the magnetization of said magnet, whereby a sufficient current in either coil will maintain its magnetization.

7. An electromagnetic detent, comprising a catch, a movable member connected thereto to withdraw the catch when influenced by a minimum or by a maximum current, and a stationary member magnetically reacting with said movable member, and having a series exciting-coil and a shunt-coil coöperating therewith to magnetize it.

8. An electromagnetic detent comprising a catch, a movable member, a stationary member magnetically reacting with said movable member, and a connection between said movable member and said catch consisting of a toggle-link, adapted in an intermediate position of said movable member to cause said catch to protrude, and adapted as said movable member moves in either direction in response to an increase or diminution of magnetism to disengage said catch.

9. An electromagnetic detent comprising stationary and movable members magnetically reacting with each other, a catch and a connection between the movable member and said catch, consisting of a pair of toggle-links arranged to be extended when said movable member is in an intermediate position, and to be contracted as the movable member moves in either direction in response to an increase or a diminution of magnetism, and connected to disengage said catch by such contraction.

10. An electromagnetic detent comprising a solenoid having a fixed coil and a movable core, a catch normally protruded, and a pair of toggle-links connected to said core at their middle part and to said catch at one end, whereby when said toggles are shortened by the movement of said core either way from its normal position the catch is withdrawn.

In witness whereof I have hereunto signed my name in the presence of two subscribing witnesses.

JAMES J. WOOD.

Witnesses:
 A. A. SERVA,
 T. H. DASCOMB.